United States Patent
Beale et al.

(10) Patent No.: US 12,556,779 B2
(45) Date of Patent: Feb. 17, 2026

(54) GENERATING LARGE SCALE REWARDED VIDEO ADVERTISEMENTS WITH HIGH IMPRESSION AND RELEVANCE

(71) Applicant: Consumable Inc., Jackson, WY (US)

(72) Inventors: Travis Beale, Cabot, PA (US); Mark H. Levin, Potomac, MD (US)

(73) Assignee: Consumable Inc., Jackson, WY (US)

( * ) Notice: Subject to any disclaimer, the term of this patent is extended or adjusted under 35 U.S.C. 154(b) by 68 days.

(21) Appl. No.: 18/674,235

(22) Filed: May 24, 2024

(65) Prior Publication Data

US 2025/0240498 A1    Jul. 24, 2025

Related U.S. Application Data

(60) Provisional application No. 63/623,661, filed on Jan. 22, 2024.

(51) Int. Cl.
*H04N 21/81* (2011.01)
*G06Q 30/0207* (2023.01)
*H04N 21/234* (2011.01)
*H04N 21/235* (2011.01)
*H04N 21/4784* (2011.01)
*H04N 21/85* (2011.01)

(52) U.S. Cl.
CPC ....... *H04N 21/812* (2013.01); *G06Q 30/0209* (2013.01); *H04N 21/23424* (2013.01); *H04N 21/235* (2013.01); *H04N 21/4784* (2013.01); *H04N 21/85* (2013.01)

(58) Field of Classification Search
CPC ........... H04N 21/812; H04N 21/23424; H04N 21/235; H04N 21/4784; H04N 21/85; H04N 21/4532; H04N 21/25891; H04N 21/44016; G06Q 30/0209; G06Q 30/0239; G06Q 30/0269; G06Q 30/0207
USPC .......................................................... 725/32
See application file for complete search history.

(56) References Cited

U.S. PATENT DOCUMENTS

| | | | |
|---|---|---|---|
| 6,057,872 A | * | 5/2000 | Candelore ........ H04N 21/44222 348/E7.071 |
| 9,973,830 B1 | * | 5/2018 | Shetty .................. H04N 21/812 |
| 11,526,904 B2 | * | 12/2022 | Hain .................... G06F 9/44526 |
| 2002/0120930 A1 | * | 8/2002 | Yona ...................... H04H 60/63 725/23 |

(Continued)

FOREIGN PATENT DOCUMENTS

WO    WO-0111882 A1 *  2/2001  ....... H04N 21/47815

*Primary Examiner* — Cynthia M Fogg
(74) *Attorney, Agent, or Firm* — Baker Botts L.L.P.

(57) ABSTRACT

In one embodiment, a method includes receiving an advertisement exchange requesting a rewarded video advertisement from an external server, tokenizing the advertisement exchange based on coding schemes, unwrapping wrappers associated with the advertisement exchange to fetch an original video media file, generating a re-encoded video media file based on re-encoding the original video media file, wherein generating the re-encoded video media file comprises integrating visual elements into the original video media file, wherein the visual elements are configured for enabling the rewarded video advertisement, generating the rewarded video advertisement based on replacing the original video media file with the re-encoded video media file, and sending the rewarded video advertisement to the external server.

19 Claims, 8 Drawing Sheets

(56) References Cited

U.S. PATENT DOCUMENTS

| | | | |
|---|---|---|---|
| 2009/0006643 A1* | 1/2009 | Lee | H04N 21/234309 709/231 |
| 2011/0067045 A1* | 3/2011 | Matheny | H04N 7/17309 725/13 |
| 2015/0230005 A1* | 8/2015 | Choi | H04N 21/4758 725/24 |
| 2017/0099592 A1* | 4/2017 | Loeb | G06Q 10/107 |
| 2017/0366872 A1* | 12/2017 | Bhogal | H04N 21/44226 |
| 2018/0165701 A1* | 6/2018 | Onda | A63F 13/30 |
| 2018/0174177 A1* | 6/2018 | Donlevy | G06F 16/9535 |
| 2020/0134676 A1* | 4/2020 | Khalil | G06F 3/0485 |
| 2021/0150586 A1* | 5/2021 | Tran | G06Q 30/0271 |
| 2022/0007065 A1* | 1/2022 | Facey | H04N 21/4348 |

\* cited by examiner

GENERATING LARGE SCALE REWARDED VIDEO ADVERTISEMENTS WITH HIGH IMPRESSION AND RELEVANCE

PRIORITY

This application claims the benefit, under 35 U.S.C. § 119(e), of U.S. Provisional Patent Application No. 63/623,661, filed 22 Jan. 2024, which is incorporated herein by reference.

TECHNICAL FIELD

This disclosure generally relates to media content recommendation, and in particular relates to systems and methods for improving media content recommendation in videos.

BACKGROUND

Media content can be integrated with digital marketing programs to help drive new revenue for publishers in order to enable them to grow and invest in their sites, apps and other programs. However, as users, they have so much information to read and watch and may be constantly scrolling and swiping on sites and apps each day. Many marketing messages (e.g., advertisements) may be on the screen during these moments, but the users may be not actually viewing them and paying attention. In other words, just because something is visibly on the screen certainly does not mean it was effective.

Many video game developers incorporate some form of in-game advertising. Among those, the most common type of advertisement may be rewarded videos, which are videos that players can watch to earn in-game prizes. Rewarded videos are shown to be more effective than forced advertising. While rewarded video has existed as a niche category of internet advertising for many years, the demand for such advertisement placements has continued to increase, owing to the user reward at the end of the video keeping the user engaged to watch the advertisement content to completion.

SUMMARY OF PARTICULAR EMBODIMENTS

In particular embodiments, one or more computing systems may receive an advertisement exchange requesting a rewarded video advertisement from an external server. The computing systems may then tokenize the advertisement exchange based on one or more coding schemes. The computing systems may then unwrap one or more wrappers associated with the advertisement exchange to fetch an original video media file. The computing systems may then generate a re-encoded video media file based on re-encoding the original video media file. In particular embodiments, generating the re-encoded video media file may comprise integrating one or more visual elements into the original video media file. The one or more visual elements may be configured for enabling the rewarded video advertisement. In particular embodiments, the computing systems may generate the rewarded video advertisement based on replacing the original video media file with the re-encoded video media file. The computing systems may further send the rewarded video advertisement to the external server.

In particular embodiments, one or more computer-readable non-transitory storage media embodying software is operable when executed to receive an advertisement exchange requesting a rewarded video advertisement from an external server. The computer-readable non-transitory storage media embodying software is further operable when executed to tokenize the advertisement exchange based on one or more coding schemes. The computer-readable non-transitory storage media embodying software is further operable when executed to unwrap one or more wrappers associated with the advertisement exchange to fetch an original video media file. The computer-readable non-transitory storage media embodying software is further operable when executed to generate a re-encoded video media file based on re-encoding the original video media file. In particular embodiments, generating the re-encoded video media file may comprise integrating one or more visual elements into the original video media file. The one or more visual elements may be configured for enabling the rewarded video advertisement. The computer-readable non-transitory storage media embodying software is further operable when executed to generate the rewarded video advertisement based on replacing the original video media file with the re-encoded video media file. The computer-readable non-transitory storage media embodying software is further operable when executed to send the rewarded video advertisement to the external server.

In particular embodiments, a system can comprise one or more processors and a non-transitory memory coupled to the processors comprising instructions executable by the processors. The processors are operable when executing the instructions to receive an advertisement exchange requesting a rewarded video advertisement from an external server. The processors are further operable when executing the instructions to tokenize the advertisement exchange based on one or more coding schemes. The processors are further operable when executing the instructions to unwrap one or more wrappers associated with the advertisement exchange to fetch an original video media file. The processors are further operable when executing the instructions to generate a re-encoded video media file based on re-encoding the original video media file. In particular embodiments, generating the re-encoded video media file may comprise integrating one or more visual elements into the original video media file. The one or more visual elements may be configured for enabling the rewarded video advertisement. The processors are further operable when executing the instructions to generate the rewarded video advertisement based on replacing the original video media file with the re-encoded video media file. The processors are further operable when executing the instructions to send the rewarded video advertisement to the external server.

Furthermore, the disclosed embodiments of the methods, computer readable non-transitory storage media, and systems can have further non-limiting features as described below.

In particular embodiments, the computing systems may receive a video advertisement request from the external server. The computing systems may then generate a notification indicating an opportunity for a rewarded video advertisement. The computing system may further transmit the notification to the external server. The advertisement exchange may be in response to the transmitted notification. In some embodiments, generating the notification indicating the opportunity for the rewarded video advertisement may comprise inserting a data field into the video advertisement request. The data field may indicate the opportunity for the rewarded video advertisement. In some embodiments, the injected data field may be determined based on configurations associated with the external server.

In particular embodiments, the advertisement exchange is based on video advertisement serving template (VAST).

In particular embodiments, the advertisement exchange may comprise one or more of an advertisement identifier, information associated with an advertisement system, an advertisement title, a description, information associated with an advertiser, a category, information associated with impression, and information associated with an original video media file.

In particular embodiments, the one or more coding schemes may be determined based on a version of the advertisement exchange.

In particular embodiments, the computing systems may determine the advertisement exchange comprises the one or more wrappers based on the tokenized advertisement exchange.

In particular embodiments, unwrapping the one or more wrappers associated with the advertisement exchange to fetch the original video media file may comprise identifying an inline advertisement from the unwrapped wrappers. The inline advertisement may point to the original video media file. Unwrapping the one or more wrappers associated with the advertisement exchange to fetch the original video media file may further comprise fetching the original video media file based on the inline advertisement.

In particular embodiments, the one or more wrappers may comprise a chain of wrappers. The chain of wrappers may comprise at least a first wrapper. The at least first wrapper may comprise at least a second wrapper. In some embodiments, unwrapping the one or more wrappers may comprise unwrapping the at least first wrapper to fetch the at least second wrapper and unwrapping the at least second wrapper to fetch the original video media file.

In particular embodiments, the computing systems may record all tracking pixels from each of the one or more wrappers. Generating the re-encoded video media file may further comprise integrating the recorded tracking pixels into the original video media file.

In particular embodiments, the computing systems may extract metadata from the advertisement exchange. As an example and not by way of limitation, the metadata may comprise one or more of an advertiser name, a domain, a click-through uniform resource locator (URL), an industry category, or a creative identifier. In some embodiments, generating the re-encoded video media file may further comprise integrating the extracted metadata into the original video media file.

In particular embodiments, the one or more visual elements may comprise one or more of a frame border, an endcard, a pre-card, a call-to-action, a countdown timer, or a QR code.

In particular embodiments, the computing systems may generate a rewards landing page. Generating the rewarded video advertisement may comprise integrating the rewards landing page into the rewarded video advertisement. In some embodiments, the rewards landing page may display one or more rewards. In an embodiment, the computing systems may determine one or more of the rewards based on contextual information associated with a target audience the rewarded video advertisement is directed to. In another embodiment, the computing systems may determine one or more of the rewards based on contextual information associated with an advertiser associated with the advertisement exchange.

Technical advantages of certain embodiments of this disclosure may include one or more of the following. The systems and methods described herein may generate large scale rewarded video advertisements with high impression and relevance for any suitable media platforms including but not limited to mobile games, non-gaming mobile apps, connected TV channels, instream and outstream video players on websites, and digital out-of-home screens. The systems and methods described herein may generate suitable rewards to match corresponding advertising experience and relevant context to improve the engagement with the end users. The systems and methods described herein may provide the functionality of rewarded video placements without the need for a specialized software development kit (SDK).

Other technical advantages will be readily apparent to one skilled in the art from the following figures, descriptions, and claims. Moreover, while specific advantages have been enumerated above, various embodiments may include all, some, or none of the enumerated advantages.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
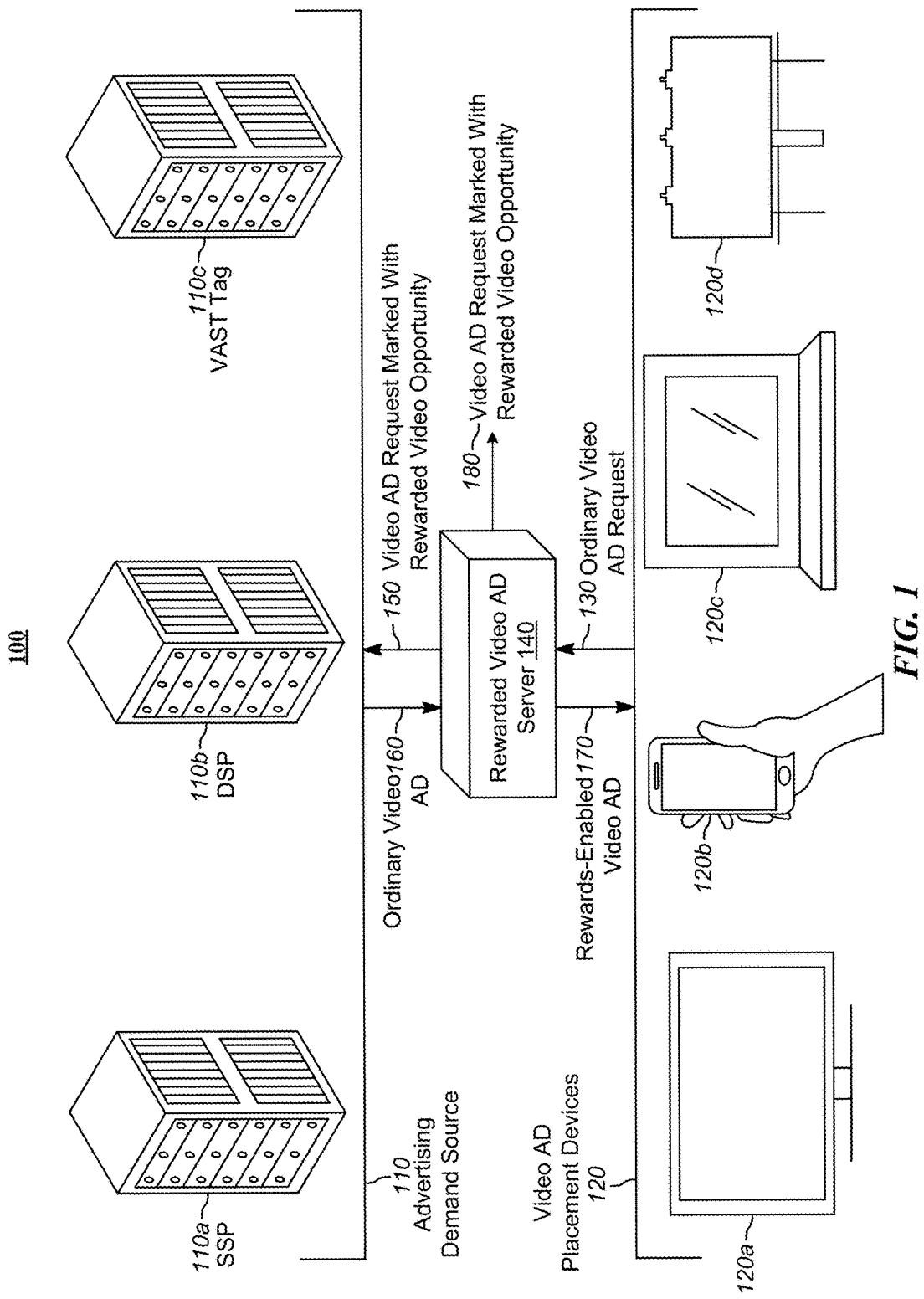
FIG. 1 illustrates an example system for generating rewarded video advertisements.

In particular embodiments, a computing system may create new advertising opportunities to satisfy the demand from advertisers for rewarded video advertisement format. The computing system may make rewarded video advertisement opportunities available not just within mobile games, but also in non-gaming mobile apps, connected TV channels, instream and outstream video players on websites, digital out-of-home screens, and more. The computing system may change any and all existing VAST video advertisement placements into rewarded video placements. In particular embodiments, the computing system may generate suitable rewards to match the corresponding advertising experience. The end users may receive such rewards for engaging with the entirety of the content. As a result, the computing system may deliver a high video completion rate by delivering key attention and message retention metrics. The embodiments disclosed herein may be optimized for connected TV (CTV) with rewarded video experience. In particular embodiments, the computing system may generate a QR code, which may create new engagement for CTV advertisers. Although this disclosure describes generating particular video content in a particular manner, this disclosure contemplates generating any suitable video content in any suitable manner.

Demand for rewarded video advertisement opportunities may far exceed supply. Conventional rewarded video advertisement technology may be largely confined to mobile games and gaming-relevant rewards (e.g., extra lives, in-game currency, etc.). In addition, because the supply of rewarded video opportunities may be limited in both volume and scope, conventional rewarded video marketplace may not have the reach of the wider programmatic advertisement marketplace. As an example and not by way of limitation, currently unless a user plays a mobile game that utilizes in-game currency, an advertiser who buys rewarded video advertisements simply may not reach that user.

The embodiments disclosed herein may solve all these problems. First, the embodiments disclosed herein may enable any standard VAST (video advertisement serving template) placement to be enhanced into a rewarded video placement, solving the supply shortage problem. VAST is a specification that sets a standard for communication requirements between advertisement servers and video players in order to present video advertisements. It is a data structure declared using XML. In order to play a video advertisement in a video player, the video player may send a request to a VAST advertisement server. The request may be a simple HTTP based URL. The advertisement server may respond with a VAST data structure that declares a plurality of parameters. As an example and not by way of limitation, the parameters may include one or more of the advertisement media that should be played, the way the advertisement media should be played, what should be tracked as the media is played, or the companion advertisement that should be displayed alongside the master advertisement.

In addition, since any VAST placement may work, the rewarded video placement may need not be in a mobile game. Instead, the rewarded video placement may be in any suitable media platform. As an example and not by way of limitation, the rewarded video placement may work in any of news websites, weather apps, out-of-home (OOH) screens, etc.

Moreover, since the rewards may be contextually relevant, a greater cross-section of user personas may be reached by the advertiser. The aforementioned features may combine to solve for the volume, scope, and reach problems outlined above.

FIG. 1 illustrates an example system 100 for generating rewarded video advertisements. System 100 may comprise any advertising demand source 110 including but not limited to a supply-side platform (SSP) 110a, a demand-side platform (DSP) 110b, or VAST tag 110c.

A VAST tag 110c may be an alternate way of requesting a video advertisement that may be supported by an SSP 110a, DSP 110b, advertisement server, instead of or in addition to OpenRTB and other methods. As an example and not by way of limitation, a VAST tag 110c may be a single-inline-linear tag, a single-skippable-inline tag, a single-redirect-linear tag, a single-redirect-error tag, a single-redirect-broken (fallback) tag, a single-VPAID 2.0-linear tag, a single-VPAID 2.0-nonlinear tag, a single-nonlinear-inline tag, a single-vertical-inline-linear tag, a tag for VMAP session ad rule pre-roll, a tag for VMAP pre-roll, a tag for VMAP pre-roll plus bumper tag, a tag for VMAP post-roll, a tag for VMAP pre-, mid-, and post-rolls, single ads, a tag for VMAP—pre-roll single ad, mid-roll standard pod with 3 ads, post-roll single ad, a tag for VMAP—pre-roll single ad, mid-roll optimized pod with 3 ads, post-roll single ad, a tag for VMAP—pre-roll single ad, mid-roll standard pod with 3 ads, post-roll single ad (bumpers around all ad breaks), a tag for VMAP-pre-roll single ad, mid-roll optimized pod with 3 ads, post-roll single ad (bumpers around all ad breaks), a tag for VMAP—pre-roll single ad, mid-roll standard pods with 5 ads every 10 seconds, post-roll single ad, a tag for SIMID survey pre-roll, or a tag for OM SDK sample pre-roll. To test an app, a user may copy and paste one of the ad tag URLs corresponding to a VAST tag 110c to the app. The user may initialize an advertisement loader and make an advertisement request immediately. The aforementioned sample advertisement tags may also work with all IMA SDKs for other platforms. To see the VAST XML advertisement responses, the user can copy them to a web browser and manually set a random integer value for the correlator parameter in every request. The user may also set the output parameter to request the advertisement response in a specific format (for example, VAST 4).

In particular embodiments, a computing system may utilize a programmatic advertisement exchange or a demand-side platform (DSP) 110b to run the rewarded video placements. A programmatic advertisement exchange is a technology platform that facilitates the buying and selling of media advertising inventory from multiple advertisement networks. A demand-side platform (DSP) 110b combines various software solutions for advertisers to automate the process of buying and selling advertisement impressions in real time. System 100 may additionally include ordinary video advertisement (AD) placement devices 120 including but not limited to a connected TV (CTV) 120a, a mobile device 120b, a computer 120c, and an out-of-home screen 120d.

At step 130, a video advertisement request marked as being for a rewarded video opportunity, e.g., using OpenRTB, VAST tag, or other transport mechanisms may be sent to a rewarded video advertisement server 140. At step 150, the rewarded video advertisement server 140 may send a video advertisement request marked as being for a rewarded video opportunity using OpenRTB, VAST tag, or other transport mechanism to the advertising demand source 110.

At step 160, the advertising demand source 110 may provide an ordinary video advertisement in VAST format or other standard to the rewarded video advertisement server 140. At step 170, the rewarded video advertisement server 140 may convert the video advertisement in VAST format or other standard to make the advertisement rewards enabled. At step 180, the rewarded video advertisement server 140 may complete an advertisement exchange that implements the rewarded video advertisement with enhanced scale, reach, and relevance.

Figure 2A:
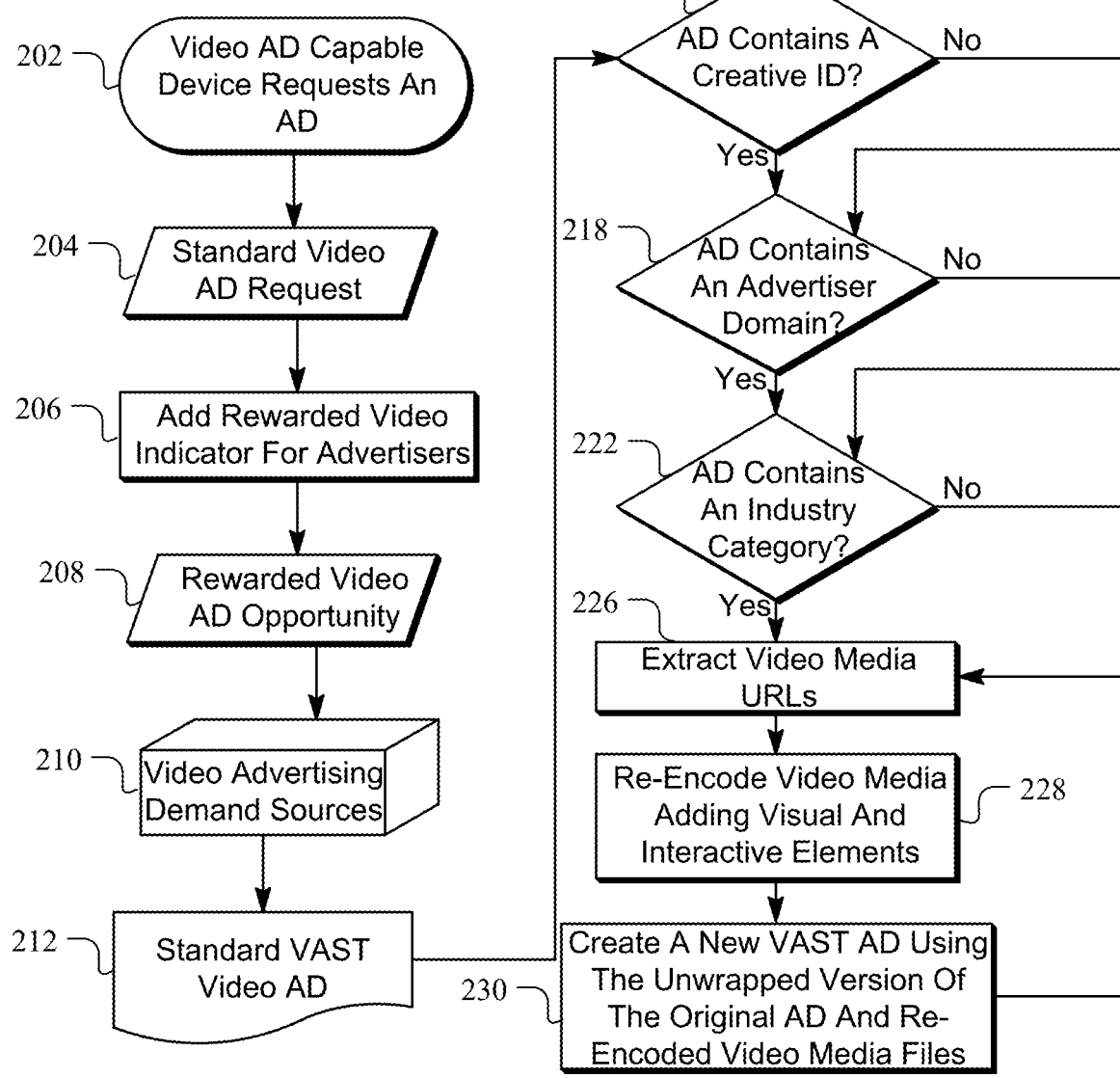
FIGS. 2A-2B illustrates an example flow diagram for generating rewarded video advertisements.
Figure 2B:
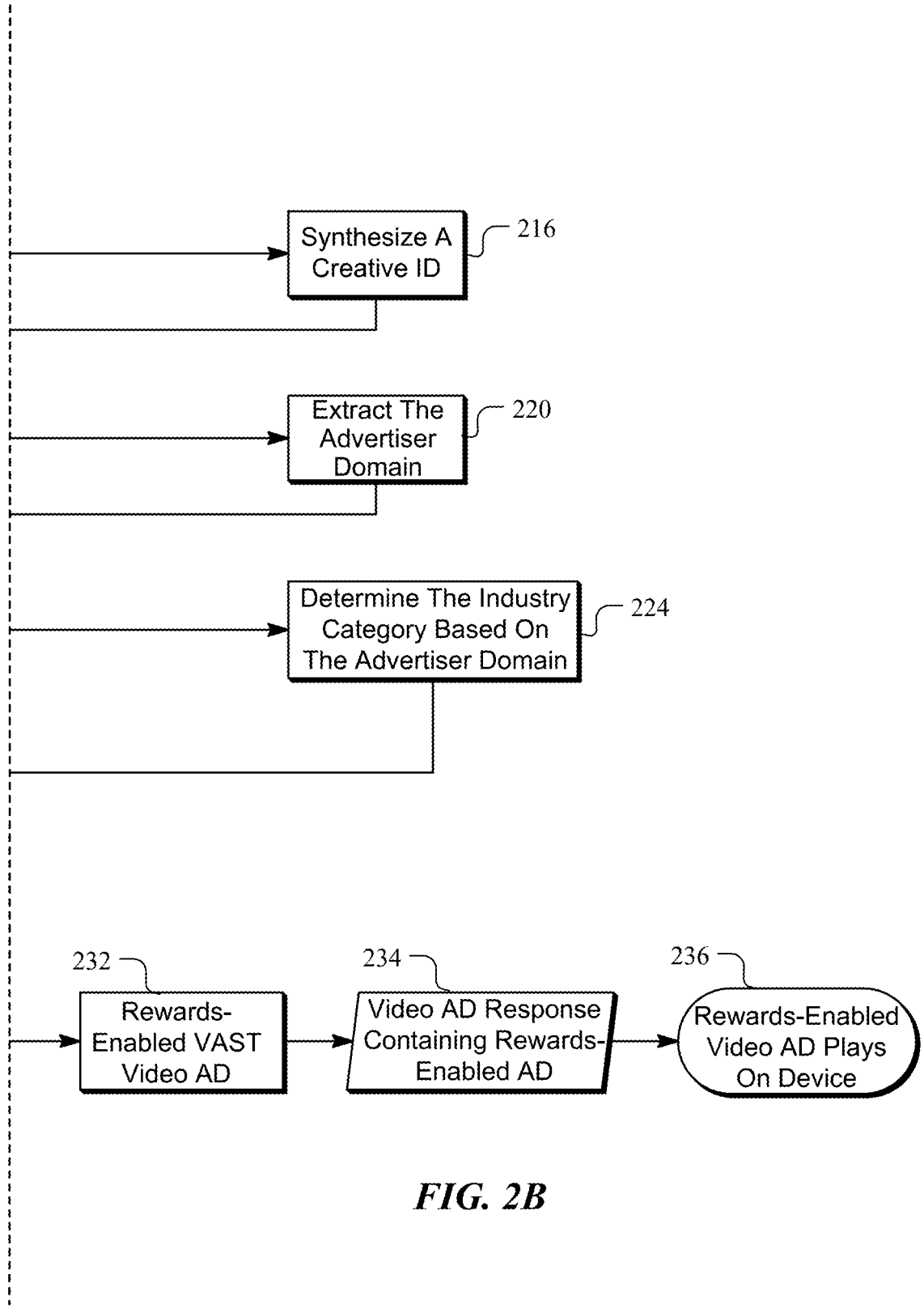

FIGS. 2A-2B illustrates an example flow diagram 200 for generating rewarded video advertisements. At step 202, a video advertisement capable device may request an advertisement. At step 204, via the advertisement exchange or DSP, the rewarded video advertisement server 140 may receive standard incoming VAST video advertisement requests from a plurality of advertisers.

At step 206, the rewarded video advertisement server 140 may add rewarded video indicator for advertisers. In other words, the rewarded video advertisement server 140 may then insert one or more appropriate signals. In particular embodiments, the computing system may inject a field into the VAST video advertisement request. The injected field may indicate that the advertiser is being offered a rewarded video opportunity. The injected field may comprise a Boolean value. In particular embodiments, the injected field may vary based on how the specific advertisement exchange or DSP is integrated. As an example and not by way of limitation, the injected field may be "imp.rwdd=1" for a platform utilizing OpenRTB version 2.6 or higher. As another example and not by way of limitation, the injected field may be "imp.video.ext.videotype=rewarded" for platforms utilizing older versions of OpenRTB. As yet another example and not by way of limitation, the injected field may be a VAST tag parameter such as "&rwdd=1".

At step 208, the rewarded video advertisement server 140 may generate a rewarded video advertisement opportunity. The rewarded video advertisement server 140 may provide the rewarded video advertisement opportunity in real time to the plurality of advertisers via the advertisement exchange or DSP.

At step 210, the video advertising demand sources 110 may receive a standard VAST video advertisement response from any advertisers wishing to pursue the rewarded video opportunity. At step 212, the rewarded video advertisement server 140 may receive a standard VAST video advertisement response.

In particular embodiments, the response may comprise information associated with the advertisement identifier, advertisement system, advertisement title, description, advertiser, category, impression, and creatives. One example VAST video advertisement response may be as follows:

```xml
<? xml version="1.0" encoding="utf-8"?>
<VAST version="4.0" xmlns:xs="http://www.w3.org/2001/XMLSchema" xmlns="http://www.iab.com/VAST">
    <Ad id="Consumable Test">
        <InLine>
            <AdSystem version="1.0">Example Ad System</AdSystem>
            <AdTitle><![CDATA[Example Ad]]></AdTitle>
            <Description><![CDATA[Example Ad]]></Description>
            <Advertiser>www.example.com</Advertiser>
            <Category>IAB18-5</Category>
            <Impression>https://eexample.com/pixel?rwdd=1&price=${AUCTION_PRICE}</Impression>
            <Creatives>
                <Creative sequence="1" id="Example Creative">
                    <Linear>
                        <Duration>00:00:30</Duration>
                        <VideoClicks>
                            <ClickThrough><![CDATA[https://www.example.com/]]></ClickThrough>
                        </VideoClicks>
                        <MediaFiles>
                            <MediaFile delivery="progressive" type="video/mp4" width="1280" height="720" bitrate="2500" scalable="true" maintainAspectRatio="true">https://cdn-dsp.consumabletv.com/testads/video/cva-test-ad_720p.mp4</MediaFile>
                            <MediaFile delivery="progressive" type="video/mp4" width="1920" height="1080" bitrate="5000" scalable="true" maintainAspectRatio="true">https://cdn-dsp.consumabletv.com/testads/video/cva-test-ad_1080p.mp4</MediaFile>
                            <MediaFile delivery="progressive" type="video/mp4" width="858" height="480" bitrate="1250" scalable="true" maintainAspectRatio="true">https://cdn-dsp.consumabletv.com/testads/video/cva-test-ad_480p.mp4</MediaFile>
                            <MediaFile delivery="progressive" type="video/mp4" width="480" height="360" bitrate="750" scalable="true" maintainAspectRatio="true">https://cdn-dsp.consumabletv.com/testads/video/cva-test-ad_360p.mp4</MediaFile>
                        </MediaFiles>
                    </Linear>
                </Creative>
            </Creatives>
        </InLine>
    </Ad>
</VAST>]]
```

Upon receiving a standard VAST video advertisement response from an advertiser, the computing system may then process, unwrap, re-encode, and re-assemble the VAST video advertisement before passing the new rewarded video advertisement back to the advertiser to be displayed to the end users.

In particular embodiments, the computing system may parse and tokenize the VAST video advertisement response so that it can be manipulated. As there can be many different versions of VAST video advertisement responses, multiple code paths may be required to achieve standards-compliant tokenization for each version of VAST video advertisement response.

The computing system may further identify the unique creative identifier for the VAST advertisement using metadata contained in the VAST as well as a global identifier for the connection. The computing system may combine the metadata and global identifier create a globally unique creative identifier. During this stage, the computing system may also extract metadata about the advertisement creative. As an example and not by way of limitation, the metadata may include the advertiser name, domain, click-through URL, and industry category, etc. The computing system may further extract the advertiser, creative identifier (ID), and click-through URL within the VAST video advertisement. In particular embodiments, the VAST advertisement may contain the metadata directly. In alternative embodiments, the computing system may synthesize the metadata using an advertisement intelligence system and a categorization database. As an example and not by way of limitation, the advertisement intelligence system may scan the VAST advertisement and determine the missing metadata (e.g., advertiser, category, etc.). The advertisement intelligence system may further recover the missing metadata. More information on metadata synthetization may be found in U.S. patent application Ser. No. 17/938,902, filed Sep. 6, 2022, which is incorporated herein by reference.

As illustrated in FIGS. 2A-2B, at step 214, the rewarded video advertisement server 140 may determine whether the response contain a creative identifier (ID). If the response does not contain a creative ID, the rewarded advertisement server 140 may synthesize a creative ID at step 216. If the response contains a creative ID or after the creative ID is synthesized, the flow diagram 200 may proceed to step 218.

At step 218, the rewarded video advertisement server 140 may determine whether the response contain an advertiser domain. If the response does not contain an advertiser domain, the rewarded advertisement server 140 may extract the advertiser domain from other sources at step 220. If the response contains an advertiser domain or after the advertiser domain is extracted, the flow diagram 200 may proceed to step 222.

At step 222, the rewarded video advertisement server 140 may determine whether the response contain an industry category. If the response does not contain an industry category, the rewarded advertisement server 140 may determine the industry category based on the advertiser domain at step 224. If the response contains an industry category or after the industry category is determined, the flow diagram 200 may proceed to step 226.

At step 226, the rewarded video advertisement server 140 may extract video media URLs. In particular embodiments, the rewarded video advertisement server 140 may unwrap the VAST video advertisement response. In particular embodiments, a VAST video advertisement response may be a wrapper, which means that it may not itself contain the original video media files and may rather contain a VastAdTagURI that needs to be fetched. The original video media files may be provided by the advertiser in their VAST video advertisement responses. Each wrapper that is fetched may contain additional wrappers. The rewarded video advertisement server 140 may follow this chain of wrappers until an inline advertisement is reached. The inline advertisement may point to the original video media files. While following this wrapper chain, the rewarded video advertisement server 140 may record all tracking pixels from each wrapper. The rewarded video advertisement server 140 may further reassemble the media files, all tracking pixels, and any creative metadata into a single unwrapped inline VAST advertisement.

Next, the rewarded video advertisement server 140 may process the creative video media files using a media encoding pipeline. At step 228, the rewarded video advertisement server 140 may re-encode the video media files to make them rewards capable. As an example and not by way of limitation, the re-encoding may include adding a frame border and an endcard. In particular embodiments, the frame border may include call-to-action text and a countdown timer. An endcard is a static visual advertisement at the end of the VAST video advertisement. As an example and not by way of limitation, the endcard may include a clickable area (for desktop or mobile devices) or a QR code (for connected TV or digital out-of-home devices). In both cases, a user who engages with the clickable area or QR code may be directed to a landing page where they are offered a reward that can be redeemed, or they may continue onto the advertiser's site. In particular embodiments, the rewarded video advertisement server 140 may add other visual elements including a pre-card, call-to-action, countdown timer, and QR code.

At step 230, the rewarded video advertisement server 140 may create a new VASST advertisement using the unwrapped version of the original advertisement and re-encoded video media files. At step 232, the rewarded video advertisement server 140 may generate a rewards-enabled VAST video advertisement. In particular embodiments, the rewarded video advertisement server 140 may re-assemble the VAST video advertisement using the re-encoded video media and rewards landing page. The rewarded video advertisement server 140 may further replace the original creative video media files in the unwrapped VAST advertisement with the re-assembled versions.

At step 234, the rewarded video advertisement server 140 may generate a video advertisement response containing rewards enabled advertisement. The rewarded video advertisement server 140 may send along the now rewards-capable advertisement to the publisher or the advertisement exchange/DSP in real time. At step 236, the rewards-enabled video advertisement may play on device.

In particular embodiments, the standard VAST video advertisement response may comprise contextual information associated with a target audience. As an example and not by way of limitation, the contextual information may indicate the video advertisement is to be displayed to a target audience playing a mobile game, watching a movie, or reading news on a website. Based on different contextual information, the rewarded video advertisement server 140 may further determine different context-relevant rewards and apply them to the rewarded video placement. As an example and not by way of limitation, rewards may include currency an end user can use in a mobile game if the contextual information indicates the video advertisement is to be displayed to a target audience playing the mobile game. As another example and not by way of limitation, rewards may include a digital coupon an end user can use to redeem for a movie ticket if the contextual information indicates the video advertisement is to be displayed to a target audience watching a movie.

In particular embodiments, the rewarded video advertisement server 140 may further determine contextual information associated with an advertiser. As an example and not by way of limitation, the advertiser may be a retailer and the rewards may include a 20% off coupon redeemable at the retailer after the advertisement for the retailer plays.

Conventionally, the publisher would need to integrate an SDK and the rewards would be handled by this SDK rather than the VAST advertisement itself. However, adding new advertising SDK's to a mobile app, a CTV app, or a website may require significant development resources. In addition, these SDK's may slow down and bloat the app or website, degrading the user experience. Finally, advertising SDK's may not co-exist together well, and it may not be possible to integrate additional advertising SDK's. Moreover, connected TV and out-of-home devices may not even have the ability to integrate a separate advertising SDK on top of what the platform already provides. To address the aforementioned limitations of integrating an SDK, the rewarded video advertisement server 140 may provide the functionality of rewarded video placements without the need for a specialized software development kit (SDK). In other words, an advertiser may add rewarded placements from existing VAST advertisements in real time without the need for specialized SDKs. All the reward capability can be an integral part of the VAST advertisement created by the embodiments disclosed herein. As a result, there may be no additional SDK needed that would fulfill the rewards.

Figure 3A:
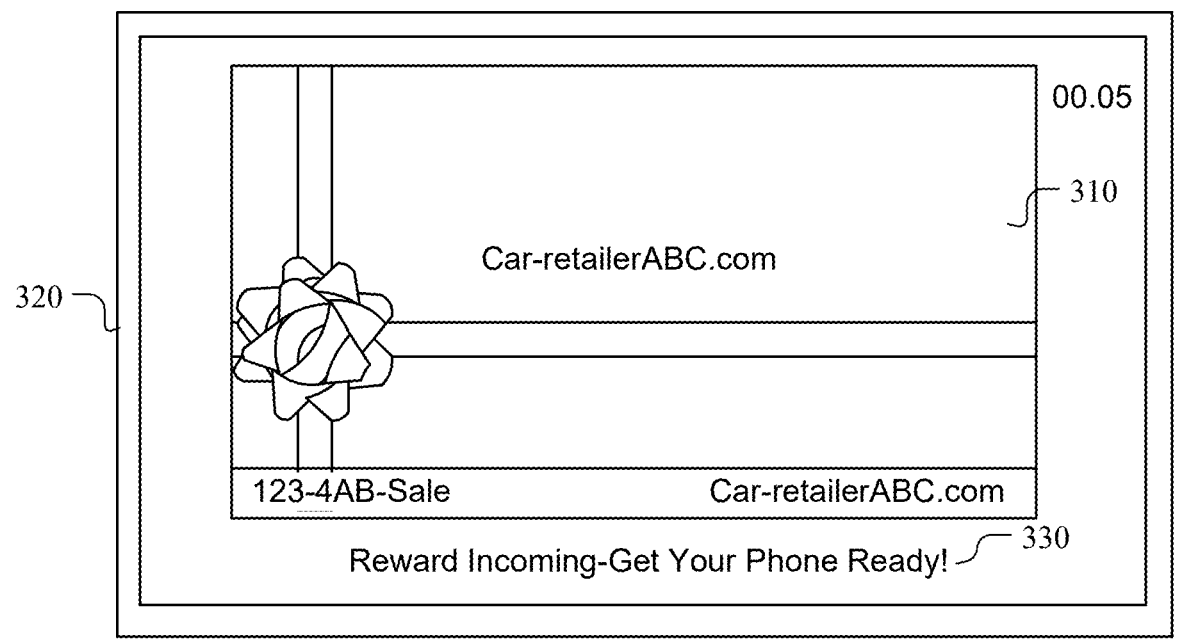
FIGS. 3A-3C illustrate an example rewarded video advertisement on connected TV.
Figure 3B:
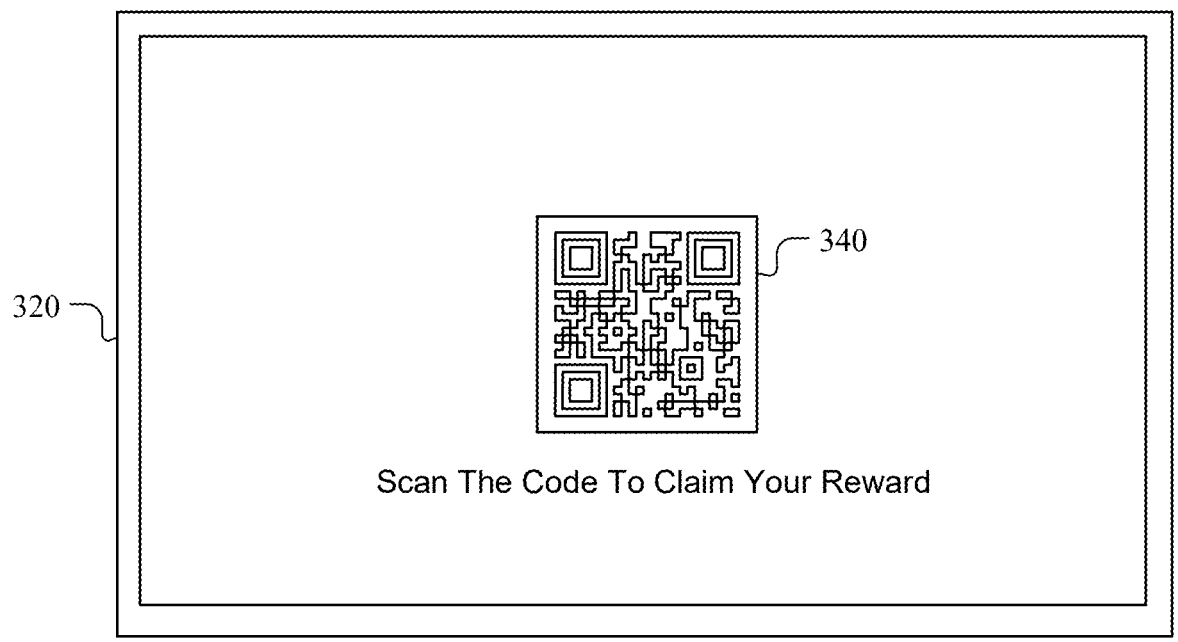
Figure 3C:
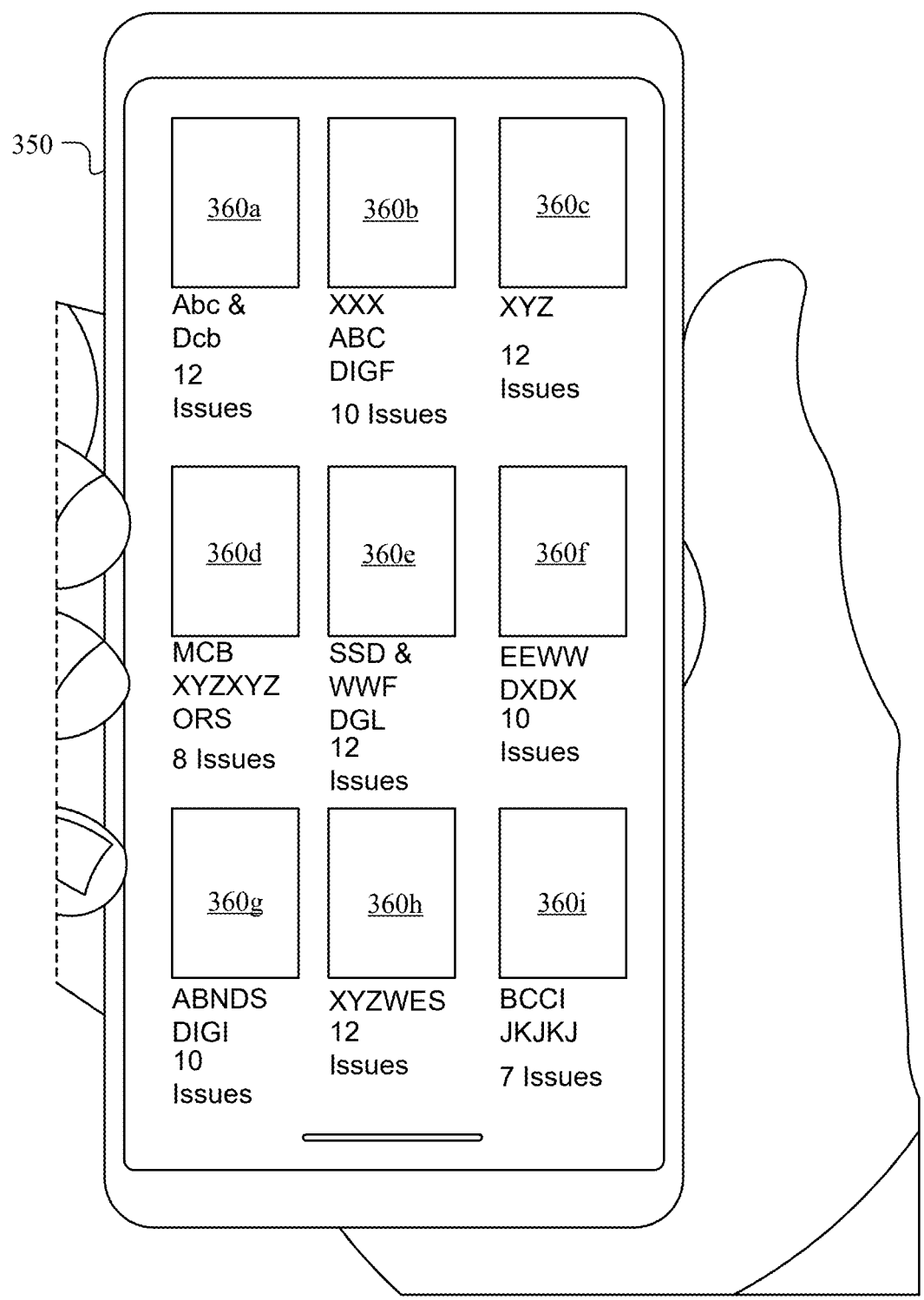

FIGS. 3A-3C illustrate an example rewarded video advertisement on connected TV. In FIG. 3A, an advertisement video 310 for a car retailer may be playing on TV 320. At the bottom of the advertisement 310, a notification 330 may be displayed to engage an end user to view the entire video. As an example and not by way of limitation, the notification 330 may be "reward incoming—get your phone ready" to let the end user know that there will be rewards if the end user completes watching the whole video advertisement 310.

FIG. 3B shows that after the video advertisement 310, an endcard is displayed. As an example and not by way of limitation, the endcard may include a QR code 340. The end user may use their phone to scan the QR code 340 to be directed to a landing page of different rewards.

FIG. 3C shows that after the end user scans the QR code 340 with their phone 350, the end user is directed to a landing page with different reward options. As an example and not by way of limitation, the rewards may include free subscriptions to different digital magazines 360.

Figure 4A:
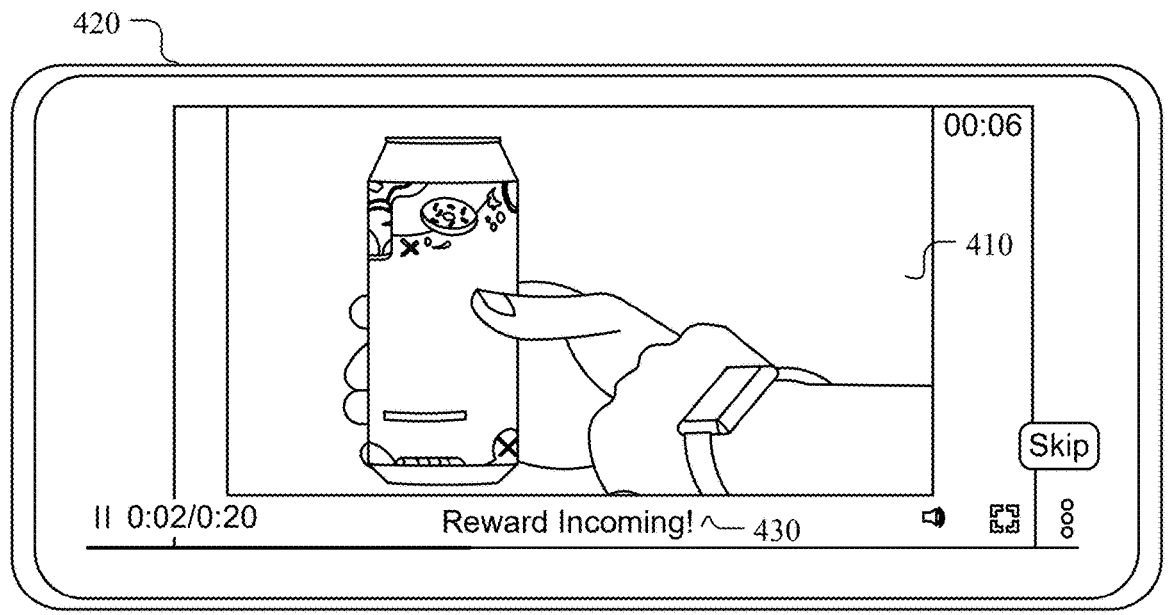
FIGS. 4A-4B illustrate an example rewarded video advertisement on a phone.
Figure 4B:

FIGS. 4A-4B illustrate an example rewarded video advertisement on a phone. In FIG. 4A, an advertisement video 410 for a drink may be playing on the phone 420. At the bottom of the advertisement 410, a notification 430 may be displayed to engage an end user to view the entire video. As an example and not by way of limitation, the notification 430 may be "reward incoming" to let the end user know that there will be rewards if the end user completes watching the whole video advertisement 410.

FIG. 4B shows that after the video advertisement 410, an endcard is displayed. As an example and not by way of limitation, the endcard may be a link 440. The end user may click on the link 440 to be directed to a landing page of different rewards to claim their reward.

The embodiments disclosed herein may result in benefits for advertisers. As an example and not by way of limitation, the embodiments disclosed herein may maintain user engagement until the end of the advertisements, maintain a high video completion rate, generate rewards being contextually relevant to the advertisers, open up new rewarded video opportunities on mobile apps that did not offer them before including non-gaming apps, offer new rewarded video opportunities on connected TV (CTV), automatically add a QR code for CTV advertisements, allow the end users to engage with CTV advertisers in a new way. As another example and not by way of limitation, publishers may receive a higher net CPM for existing video advertisement placements since rewarded video advertisements may pay a higher cost-per-thousand (CPM) rate. In addition, rewards may be contextually relevant to the publisher. For example, the rewards may include a free subscription to a fashion magazine offered on a fashion news website.

Figure 5:
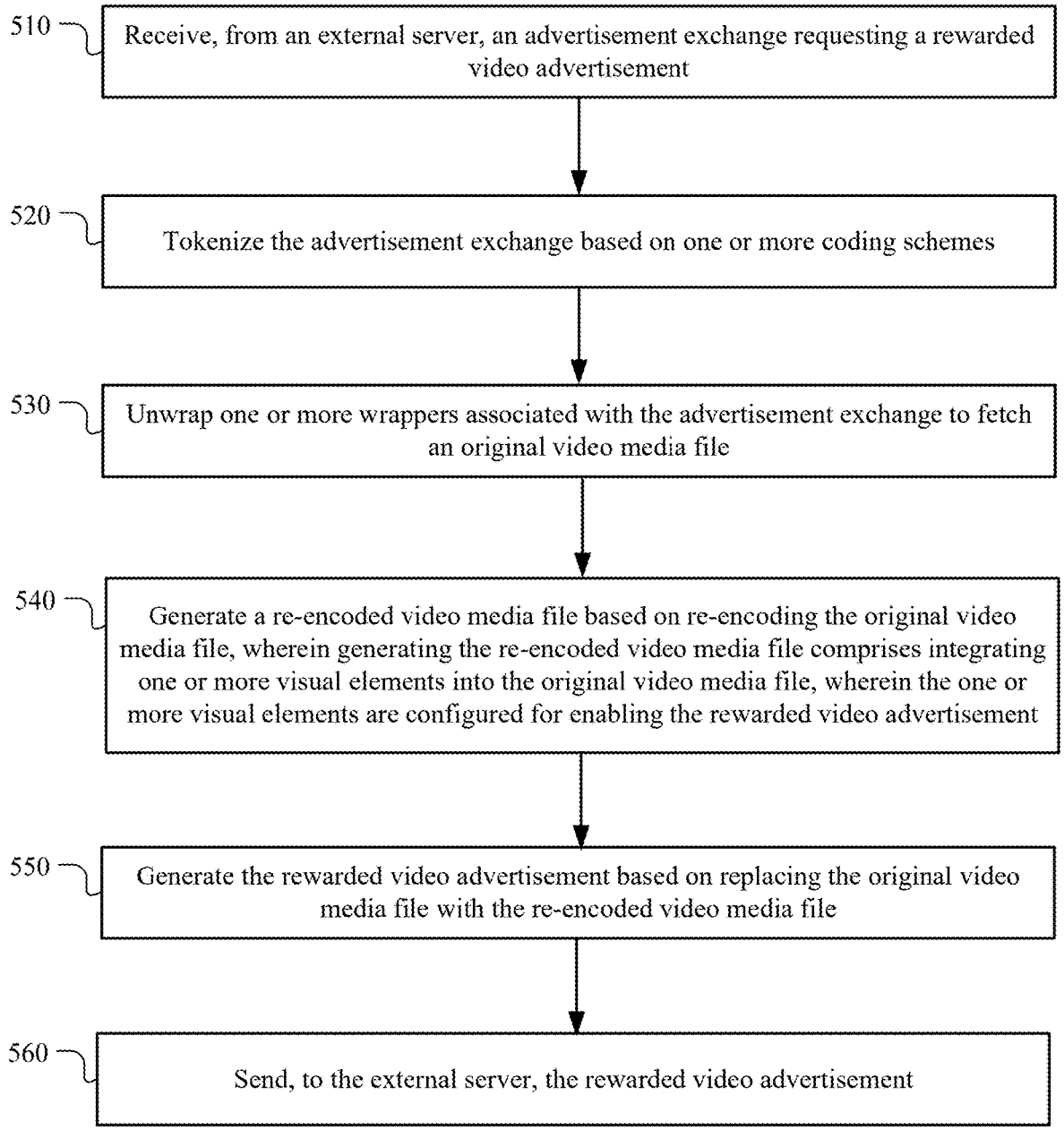
FIG. 5 illustrates an example method for generating rewarded video advertisements.

FIG. 5 illustrates an example method 500 for generating rewarded video advertisements. The method may begin at step 510, where the rewarded video advertisement server 140 may receive, from an external server, an advertisement exchange requesting a rewarded video advertisement. At step 520, the rewarded video advertisement server 140 may tokenize the advertisement exchange based on one or more coding schemes. At step 530, the rewarded video advertisement server 140 may unwrap one or more wrappers associated with the advertisement exchange to fetch an original video media file. At step 540, the rewarded video advertisement server 140 may generate a re-encoded video media file based on re-encoding the original video media file, wherein generating the re-encoded video media file comprises integrating one or more visual elements into the original video media file, wherein the one or more visual elements are configured for enabling the rewarded video advertisement. At step 550, the rewarded video advertisement server 140 may generate the rewarded video advertisement based on replacing the original video media file with the re-encoded video media file. At step 560, the rewarded video advertisement server 140 may send, to the external server, the rewarded video advertisement. Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for generating rewarded video advertisements including the particular steps of the method of FIG. 5, this disclosure contemplates any suitable method for generating rewarded video advertisements including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Systems and Methods

Figure 6:
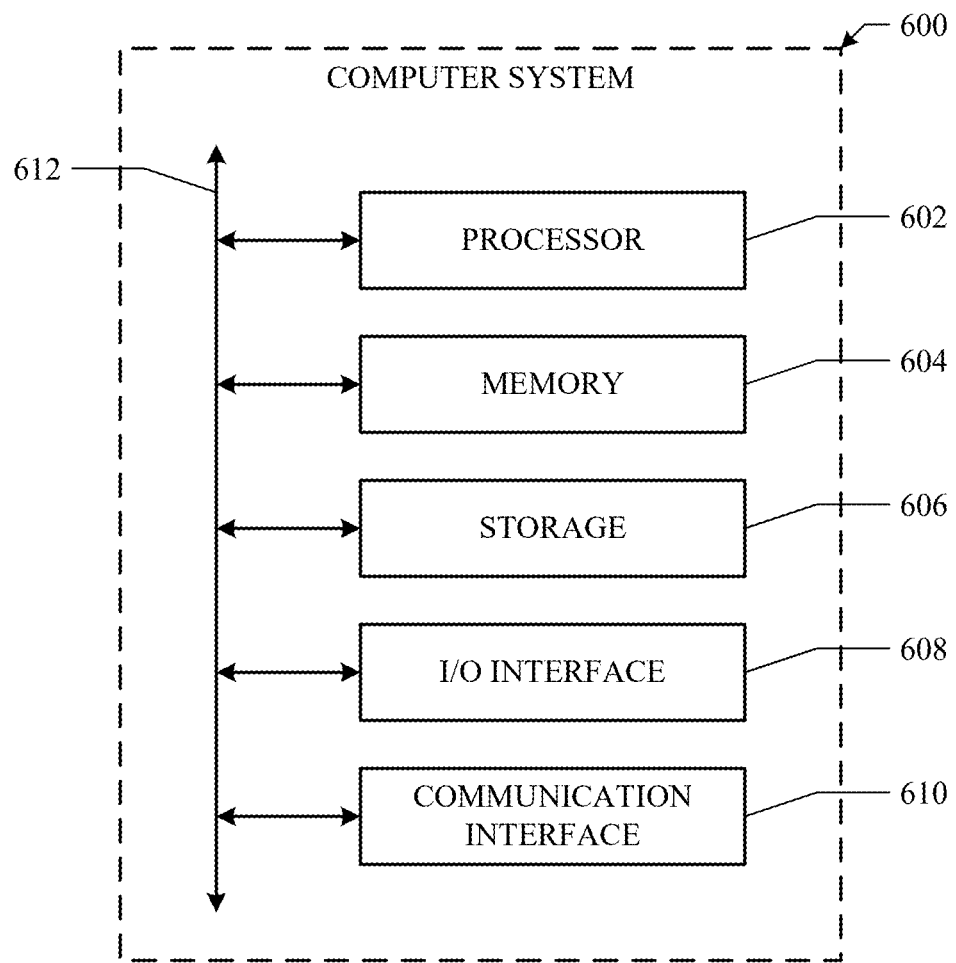
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing systems:
   receiving, from an external server, an advertisement exchange from an advertiser requesting a generation of a rewarded video advertisement;
   tokenizing the advertisement exchange based on one or more coding schemes determined based on a version of the advertisement exchange;
   unwrapping one or more wrappers associated with the advertisement exchange to fetch an original video media file;
   generating a re-encoded video media file based on re-encoding the original video media file, wherein generating the re-encoded video media file comprises integrating one or more visual elements into the original video media file, wherein the one or more visual elements are configured for enabling the rewarded video advertisement, and wherein the one or more visual elements are determined based on an intended device type;
   generating the rewarded video advertisement based on replacing the original video media file with the re-encoded video media file; and
   sending, to the external server, the rewarded video advertisement.

2. The method of claim 1, further comprising:
receiving, from the external server, a video advertisement request;
generating a notification indicating an opportunity for a rewarded video advertisement; and
transmitting the notification to the external server, wherein the advertisement exchange is in response to the transmitted notification.

3. The method of claim 2, wherein generating the notification indicating the opportunity for the rewarded video advertisement comprises:
inserting a data field into the video advertisement request, wherein the data field indicates the opportunity for the rewarded video advertisement.

4. The method of claim 3, wherein the injected data field is determined based on configurations associated with the external server.

5. The method of claim 1, wherein the advertisement exchange is based on video advertisement serving template (VAST).

6. The method of claim 1, wherein the advertisement exchange comprises one or more of an advertisement identifier, information associated with an advertisement system, an advertisement title, a description, information associated with the advertiser, a category, information associated with impression, and information associated with an original video media file.

7. The method of claim 1, further comprising:
determining, based on the tokenized advertisement exchange, the advertisement exchange comprises the one or more wrappers.

8. The method of claim 1, wherein unwrapping the one or more wrappers associated with the advertisement exchange to fetch the original video media file comprises:
identifying an inline advertisement from the unwrapped wrappers, wherein the inline advertisement points to the original video media file; and
fetching the original video media file based on the inline advertisement.

9. The method of claim 1, wherein the one or more wrappers comprise a chain of wrappers, wherein the chain of wrappers comprise at least a first wrapper, wherein the at least first wrapper comprises at least a second wrapper, and wherein unwrapping the one or more wrappers comprises:
unwrapping the at least first wrapper to fetch the at least second wrapper; and
unwrapping the at least second wrapper to fetch the original video media file.

10. The method of claim 1, further comprising:
recording all tracking pixels from each of the one or more wrappers, wherein generating the re-encoded video media file further comprises integrating the recorded tracking pixels into the original video media file.

11. The method of claim 1, further comprising:
extracting metadata from the advertisement exchange, wherein the metadata comprises one or more of an advertiser name, a domain, a click-through uniform resource locator (URL), an industry category, or a creative identifier.

12. The method of claim 11, wherein generating the re-encoded video media file further comprises integrating the extracted metadata into the original video media file.

13. The method of claim 1, wherein the one or more visual elements comprise one or more of a frame border, an endcard, a pre-card, a call-to-action, a countdown timer, or a QR code.

14. The method of claim 1, further comprising:
generating a rewards landing page, wherein generating the rewarded video advertisement comprises integrating the rewards landing page into the rewarded video advertisement.

15. The method of claim 14, wherein the rewards landing page display one or more rewards.

16. The method of claim 15, further comprising:
determining one or more of the rewards based on contextual information associated with a target audience the rewarded video advertisement is directed to.

17. The method of claim 15, further comprising:
determining one or more of the rewards based on contextual information associated with the advertiser associated with the advertisement exchange.

18. One or more computer-readable non-transitory storage media embodying software that is operable when executed to:
receive, from an external server, an advertisement exchange from an advertiser requesting a generation of a rewarded video advertisement;
tokenize the advertisement exchange based on one or more coding schemes determined based on a version of the advertisement exchange;
unwrap one or more wrappers associated with the advertisement exchange to fetch an original video media file;
generate a re-encoded video media file based on re-encoding the original video media file, wherein generating the re-encoded video media file comprises integrating one or more visual elements into the original video media file, wherein the one or more visual elements are configured for enabling the rewarded video advertisement, and wherein the one or more visual elements are determined based on an intended device type;
generate the rewarded video advertisement based on replacing the original video media file with the re-encoded video media file; and
send, to the external server, the rewarded video advertisement.

19. A system comprising: one or more processors; and a non-transitory memory coupled to the processors comprising instructions executable by the processors, the processors operable when executing the instructions to:
receive, from an external server, an advertisement exchange from an advertiser requesting a generation of a rewarded video advertisement;
tokenize the advertisement exchange based on one or more coding schemes determined based on a version of the advertisement exchange;
unwrap one or more wrappers associated with the advertisement exchange to fetch an original video media file;
generate a re-encoded video media file based on re-encoding the original video media file, wherein generating the re-encoded video media file comprises integrating one or more visual elements into the original video media file, wherein the one or more visual elements are configured for enabling the rewarded video advertisement, and wherein the one or more visual elements are determined based on an intended device type;
generate the rewarded video advertisement based on replacing the original video media file with the re-encoded video media file; and
send, to the external server, the rewarded video advertisement.

* * * * *